United States Patent
Perry

(10) Patent No.: US 11,637,298 B2
(45) Date of Patent: Apr. 25, 2023

(54) REDOX FLOW BATTERY WITH ELECTROLYTE BALANCING AND COMPATIBILITY ENABLING FEATURES

(71) Applicant: RAYTHEON TECHNOLOGIES CORPORATION, Farmington, CT (US)

(72) Inventor: Michael L. Perry, Glastonbury, CT (US)

(73) Assignee: RAYTHEON TECHNOLOGIES CORPORATION, Arlington, VA (US)

( * ) Notice: Subject to any disclaimer, the term of this patent is extended or adjusted under 35 U.S.C. 154(b) by 121 days.

(21) Appl. No.: 17/361,385

(22) Filed: Jun. 29, 2021

(65) Prior Publication Data

US 2021/0328241 A1 Oct. 21, 2021

Related U.S. Application Data

(62) Division of application No. 16/052,727, filed on Aug. 2, 2018, now Pat. No. 11,056,698.

(51) Int. Cl.
*H01M 8/04186* (2016.01)
*H01M 4/36* (2006.01)
(Continued)

(52) U.S. Cl.
CPC ....... *H01M 8/04186* (2013.01); *H01M 4/368* (2013.01); *H01M 8/0482* (2013.01);
(Continued)

(58) Field of Classification Search
CPC . H01M 2300/0005; H01M 2300/0014; H01M 4/368; H01M 8/04186;
(Continued)

(56) References Cited

U.S. PATENT DOCUMENTS 3,152,013 A 10/1964 Juda
3,245,836 A 4/1966 Agruss
(Continued)

FOREIGN PATENT DOCUMENTS

CN 1845368 10/2006
CN 101325252 12/2008
(Continued)

OTHER PUBLICATIONS

Darling, R., Gallagher, K., Xie, W., Su, Liang, and Brushett, F. (2016). Transport property requirements for flow battery separators. Journal of the Electrochemical Society, 163 (1). pp. A5029-A5040.
(Continued)

*Primary Examiner* — Lingwen R Zeng
(74) *Attorney, Agent, or Firm* — Carlson, Gaskey & Olds, P.C.

(57) ABSTRACT

A redox flow battery includes first and second cells. Each cell has electrodes and a separator layer arranged between the electrodes. A first circulation loop is fluidly connected with the first electrode of the first cell. A polysulfide electrolyte solution has a pH 11.5 or greater and is contained in the first recirculation loop. A second circulation loop is fluidly connected with the second electrode of the second cell. An iron electrolyte solution has a pH 3 or less and is contained in the second circulation loop. A third circulation loop is fluidly connected with the second electrode of the first cell and the first electrode of the second cell. An intermediator electrolyte solution is contained in the third circulation loop. The cells are operable to undergo reversible reactions to store input electrical energy upon charging and discharge the stored electrical energy upon discharging.

8 Claims, 4 Drawing Sheets

(51) Int. Cl.
   *H01M 8/04082* (2016.01)
   *H01M 8/04791* (2016.01)
   *H01M 8/08* (2016.01)
   *H01M 8/18* (2006.01)
   *H01M 8/2455* (2016.01)
   *H01M 8/20* (2006.01)

(52) U.S. Cl.
   CPC ... *H01M 8/04201* (2013.01); *H01M 8/04798* (2013.01); *H01M 8/08* (2013.01); *H01M 8/188* (2013.01); *H01M 8/2455* (2013.01); *H01M 8/184* (2013.01); *H01M 8/20* (2013.01); *H01M 2300/0005* (2013.01); *H01M 2300/0014* (2013.01); *Y02E 60/10* (2013.01); *Y02E 60/50* (2013.01)

(58) Field of Classification Search
   CPC ......... H01M 8/04201; H01M 8/04798; H01M 8/0482; H01M 8/08; H01M 8/184; H01M 8/188; H01M 8/20; H01M 8/2455; Y02E 60/10; Y02E 60/50
   See application file for complete search history.

(56) References Cited

U.S. PATENT DOCUMENTS

| | | | |
|---|---|---|---|
| 4,053,684 A | | 10/1977 | Zito, Jr. et al. |
| 4,124,478 A | | 11/1978 | Tsien et al. |
| 4,180,623 A | | 12/1979 | Adams |
| 4,407,902 A | | 10/1983 | Kummer et al. |
| 4,786,567 A | | 11/1988 | Skyllas-Kazacos et al. |
| 5,188,911 A | | 2/1993 | Downing et al. |
| 5,270,132 A | | 12/1993 | Breault et al. |
| 5,298,341 A | | 3/1994 | Khandkar et al. |
| 5,318,865 A | | 6/1994 | Kaneko et al. |
| 5,612,148 A | * | 3/1997 | Zito .................... H01M 8/0289 429/105 |
| 5,648,184 A | | 7/1997 | Inoue et al. |
| 5,830,603 A | | 11/1998 | Oka et al. |
| 5,851,694 A | | 12/1998 | Miyabayashi et al. |
| 6,007,933 A | | 12/1999 | Jones |
| 6,309,532 B1 | | 10/2001 | Tran et al. |
| 6,355,373 B1 | | 3/2002 | Pauling |
| 6,416,899 B1 | | 7/2002 | Wariishi et al. |
| 6,472,095 B2 | | 10/2002 | Margiott |
| 6,476,583 B2 | | 11/2002 | McAndrews |
| 6,522,919 B1 | | 2/2003 | Flower et al. |
| 6,628,085 B2 | | 9/2003 | Yang |
| 6,692,862 B1 | | 2/2004 | Zocchi |
| 6,828,055 B2 | | 12/2004 | Kearl |
| 6,841,294 B1 | | 1/2005 | Morrissey et al. |
| 7,105,245 B2 | | 9/2006 | Ohlsen et al. |
| 7,199,550 B2 | | 4/2007 | Tsutsui et al. |
| 7,250,229 B2 | | 7/2007 | Yang et al. |
| 7,410,712 B2 | | 8/2008 | Reiser et al. |
| 7,527,886 B2 | | 5/2009 | Fuller et al. |
| 7,790,303 B2 | | 9/2010 | Fredette |
| 7,820,321 B2 | | 10/2010 | Horne et al. |
| 7,855,015 B1 | | 12/2010 | Benson et al. |
| 7,855,020 B1 | | 12/2010 | Margiott et al. |
| 7,955,746 B2 | | 6/2011 | Fredette |
| 7,976,974 B2 | | 7/2011 | Kazacos et al. |
| 8,062,801 B2 | | 11/2011 | Moran et al. |
| 8,142,950 B2 | | 3/2012 | Reiser et al. |
| 8,587,255 B2 | | 11/2013 | Parakulam et al. |
| 9,166,243 B2 | | 10/2015 | Perry |
| 9,276,282 B2 | | 3/2016 | Zhang et al. |
| 2001/0028977 A1 | | 10/2001 | Kazacos et al. |
| 2002/0014880 A1 | | 2/2002 | McAndrews |
| 2002/0064702 A1 | | 5/2002 | Gibb |
| 2002/0086200 A1 | | 7/2002 | Margiott |
| 2002/0192513 A1 | | 12/2002 | Colbow et al. |
| 2003/0087156 A1 | | 5/2003 | Broman et al. |
| 2003/0129468 A1 | | 7/2003 | Issacci et al. |
| 2003/0134163 A1 | | 7/2003 | Markoski et al. |
| 2004/0028989 A1 | | 2/2004 | Sun et al. |
| 2004/0070370 A1 | | 4/2004 | Emura |
| 2004/0086763 A1 | | 5/2004 | Paddison |
| 2004/0126642 A1 | | 7/2004 | Smedley et al. |
| 2004/0151960 A1 | | 8/2004 | Rock |
| 2004/0191623 A1 | | 9/2004 | Kubata et al. |
| 2004/0202915 A1 | | 10/2004 | Nakaishi et al. |
| 2004/0224192 A1 | | 11/2004 | Pearson |
| 2004/0241544 A1 | | 12/2004 | Nakaishi et al. |
| 2004/0256247 A1 | | 12/2004 | Carson et al. |
| 2005/0074649 A1 | | 4/2005 | Skiba et al. |
| 2005/0074653 A1 | | 4/2005 | Broman et al. |
| 2005/0106450 A1 | | 5/2005 | Castro et al. |
| 2005/0136301 A1 | | 6/2005 | Knaggs et al. |
| 2005/0158614 A1 | | 7/2005 | Hennessy |
| 2005/0244703 A1 | | 11/2005 | Osenar et al. |
| 2005/0260473 A1 | | 11/2005 | Wang |
| 2006/0003210 A1 | | 1/2006 | Ofer et al. |
| 2006/0108214 A1 | | 5/2006 | Amendola |
| 2006/0138996 A1 | | 6/2006 | Graham et al. |
| 2006/0147795 A1 | | 7/2006 | Li et al. |
| 2006/0183016 A1 | | 8/2006 | Kazacos et al. |
| 2007/0178359 A1 | | 8/2007 | Peng et al. |
| 2008/0115930 A1 | | 5/2008 | Peters et al. |
| 2008/0193828 A1 | | 8/2008 | Sahu |
| 2008/0274393 A1 | | 11/2008 | Markoski et al. |
| 2008/0292938 A1 | | 11/2008 | Perry et al. |
| 2009/0071841 A1 | | 3/2009 | Pal et al. |
| 2009/0092882 A1 | | 4/2009 | Kjeang et al. |
| 2009/0136789 A1 | | 5/2009 | Pien et al. |
| 2009/0311567 A1 | | 12/2009 | Visco et al. |
| 2010/0003545 A1 | | 1/2010 | Horne et al. |
| 2010/0003586 A1 | | 1/2010 | Sahu |
| 2010/0047671 A1 | | 2/2010 | Chiang et al. |
| 2010/0092813 A1 | | 4/2010 | Sahu |
| 2010/0104904 A1 | | 4/2010 | Rao et al. |
| 2010/0136455 A1 | | 6/2010 | Winter |
| 2010/0143781 A1 | * | 6/2010 | Keshavarz .............. H01M 8/20 75/739 |
| 2010/0178533 A1 | | 7/2010 | Whitehead et al. |
| 2010/0323264 A1 | | 12/2010 | Chiang et al. |
| 2010/0330451 A1 | | 12/2010 | Shinozaki et al. |
| 2011/0006737 A1 | | 1/2011 | Saligram et al. |
| 2011/0008706 A1 | | 1/2011 | Cipollini |
| 2011/0020732 A1 | | 1/2011 | Darling |
| 2011/0045332 A1 | | 2/2011 | Horne et al. |
| 2011/0074357 A1 | | 3/2011 | Parakulam et al. |
| 2011/0086247 A1 | | 4/2011 | Keshavarz et al. |
| 2011/0087389 A1 | | 4/2011 | Burleigh et al. |
| 2011/0117975 A1 | | 5/2011 | Dunn et al. |
| 2011/0119005 A1 | | 5/2011 | Majima et al. |
| 2011/0123896 A1 | | 5/2011 | Jomori et al. |
| 2011/0143249 A1 | | 6/2011 | Izawa et al. |
| 2011/0189520 A1 | | 8/2011 | Carter et al. |
| 2011/0223450 A1 | | 9/2011 | Horne et al. |
| 2011/0223451 A1 | | 9/2011 | Winter et al. |
| 2011/0223496 A1 | | 9/2011 | Makita et al. |
| 2011/0248653 A1 | | 10/2011 | Brotto et al. |
| 2011/0249373 A1 | | 10/2011 | Farahmandi |
| 2011/0269055 A1 | | 11/2011 | Perry |
| 2011/0274948 A1 | | 11/2011 | Duduta et al. |
| 2012/0003562 A1 | | 1/2012 | Takehiro et al. |
| 2012/0030886 A1 | | 2/2012 | Persson et al. |
| 2012/0045680 A1 | | 2/2012 | Dong et al. |
| 2012/0052347 A1 | | 3/2012 | Wilson et al. |
| 2012/0100461 A1 | | 4/2012 | Iden et al. |
| 2012/0202099 A1 | | 8/2012 | Perry et al. |
| 2012/0203392 A1 | | 8/2012 | Pandy et al. |
| 2012/0208061 A1 | | 8/2012 | Sahu et al. |
| 2012/0220673 A1 | | 8/2012 | Browning et al. |
| 2012/0244406 A1 | * | 9/2012 | Xia .................... H01M 8/18 429/107 |
| 2012/0149573 A1 | | 10/2012 | Lomax, Jr. et al. |
| 2012/0247573 A1 | | 10/2012 | Lomax, Jr. et al. |
| 2012/0258345 A1 | | 10/2012 | Zaffou et al. |
| 2012/0306452 A1 | | 12/2012 | Christensen et al. |
| 2012/0308856 A1 | | 12/2012 | Horne et al. |
| 2012/0321920 A1 | | 12/2012 | Perry et al. |

(56) References Cited

U.S. PATENT DOCUMENTS

| | | |
|---|---|---|
| 2012/0326672 A1 | 12/2012 | Dennis et al. |
| 2012/0328910 A1 | 12/2012 | Ia O' et al. |
| 2013/0011704 A1 | 1/2013 | Horne et al. |
| 2013/0022846 A1 | 1/2013 | Liu et al. |
| 2013/0029196 A1 | 1/2013 | Perry et al. |
| 2013/0059189 A1 | 3/2013 | Benham |
| 2013/0084482 A1 | 4/2013 | Chang et al. |
| 2013/0084506 A1 | 4/2013 | Chang et al. |
| 2013/0095362 A1 | 4/2013 | Keshavarz et al. |
| 2013/0136199 A1 | 5/2013 | Wan et al. |
| 2013/0154364 A1 | 6/2013 | Hennessy |
| 2013/0157087 A1 | 6/2013 | Pandy et al. |
| 2013/0157155 A1 | 6/2013 | Park et al. |
| 2013/0217851 A1 | 8/2013 | Fedurco et al. |
| 2013/0316199 A1 | 11/2013 | Keshavarz et al. |
| 2013/0316268 A1 | 11/2013 | Lee et al. |
| 2014/0030631 A1 | 1/2014 | Esswein et al. |
| 2014/0127542 A1 | 5/2014 | Li et al. |
| 2014/0377687 A1 | 12/2014 | Miyake et al. |
| 2016/0126579 A1 | 5/2016 | Darling et al. |
| 2016/0233531 A1 | 8/2016 | Reece et al. |

FOREIGN PATENT DOCUMENTS

| | | |
|---|---|---|
| CN | 102354761 | 2/2012 |
| CN | 102859775 | 1/2013 |
| CN | 103000927 | 3/2013 |
| EP | 0517217 | 12/1992 |
| EP | 2395584 | 12/2011 |
| EP | 2856549 | 4/2015 |
| GB | 1375437 | 11/1974 |
| GB | 2010574 | 6/1979 |
| GB | 2372143 | 8/2002 |
| GB | 2390738 | 1/2004 |
| JP | S54-19228 | 7/1979 |
| JP | 6047373 | 3/1985 |
| JP | 61173468 | 8/1986 |
| JP | 63213261 | 9/1988 |
| JP | 01146267 | 6/1989 |
| JP | 02148659 | 6/1990 |
| JP | H02-148659 | 6/1990 |
| JP | H02195657 | 8/1990 |
| JP | 04-223049 | 8/1992 |
| JP | 7-192748 | 7/1995 |
| JP | H07192748 | 7/1995 |
| JP | 09101286 | 4/1997 |
| JP | 10040944 | 2/1998 |
| JP | 2000030721 | 1/2000 |
| JP | 2002175822 | 6/2002 |
| JP | 2003079070 | 3/2003 |
| JP | 2003157883 | 5/2003 |
| JP | 2003217607 | 7/2003 |
| JP | 2003303611 | 10/2003 |
| JP | 2004519814 | 7/2004 |
| JP | 2005228645 | 8/2005 |
| JP | 2006-156029 | 6/2006 |
| JP | 2006313691 | 11/2006 |
| JP | 2007188729 | 7/2007 |
| JP | 2008166164 | 7/2008 |
| JP | 2008544444 | 12/2008 |
| JP | 2009-283425 | 12/2009 |
| JP | 2010244972 | 10/2010 |
| JP | 2011527509 | 10/2011 |
| JP | 2012164530 | 8/2012 |
| JP | 2014-508384 | 4/2014 |
| JP | 2014098137 | 5/2014 |
| JP | 2015519718 | 7/2015 |
| JP | 2017517101 | 6/2017 |
| KR | 1020060016399 | 2/2006 |
| KR | 20100040606 | 4/2010 |
| WO | 1989005363 | 6/1989 |
| WO | 1989005528 | 6/1989 |
| WO | 9003666 | 4/1990 |
| WO | 9409525 | 4/1994 |
| WO | 9409526 | 4/1994 |
| WO | 0215317 | 2/2002 |
| WO | 03041199 | 5/2003 |
| WO | 03050900 | 6/2003 |
| WO | 2004071967 | 8/2004 |
| WO | 2004079849 | 9/2004 |
| WO | 2005057707 | 6/2005 |
| WO | 2006026585 | 3/2006 |
| WO | 20060135958 | 12/2006 |
| WO | 2007086828 | 8/2007 |
| WO | 20080148148 | 12/2008 |
| WO | 2009017150 | 2/2009 |
| WO | 2010067453 | 6/2010 |
| WO | 2010107429 | 9/2010 |
| WO | 2011075135 | 6/2011 |
| WO | 2012088442 | 6/2012 |
| WO | 20120135473 | 10/2012 |
| WO | 2012160406 | 11/2012 |
| WO | 2012162390 | 11/2012 |
| WO | 2013027076 | 2/2013 |
| WO | 2013018383 | 4/2013 |
| WO | 2013095374 | 6/2013 |
| WO | 2013095378 | 6/2013 |
| WO | 2013131838 | 9/2013 |
| WO | 2013177414 | 11/2013 |
| WO | 2014088601 | 6/2014 |
| WO | 2014098917 | 6/2014 |
| WO | 2013054921 | 4/2015 |
| WO | 2015119272 | 8/2015 |

OTHER PUBLICATIONS

Escribano, S., Blachot, J-F., Etheve, J., Morin, A., and Mosdale, R. (2006). Characterization of PEMFCs gas diffusion layers properties. Journal of Power Sources 156. pp. 8-13.

Skyllas-Kazacos, M., McCann, J., Li, Y., Bao, J., and Tang, A. (2016). The mechanism and modelling of shunt current in the vanadium redox flow battery. Chemistry Select. 2016. pp. 2249-2256.

Luo, X., Lu, Z., Xi, J., Wu, Z., Zhu, W., Chen, L., and Qiu, X. (2005). Influences of permeation of vanadium ions through PVDF-g PSSA membranes on performances of vanadium redox flow batteries. Journal of Physical Chemistry B, 109. 2005. pp. 20310-20314.

Negishi, A. (2003). Redox flow battery. Fuel Cells vol. 2(4). 2003. pp. 69-74.

Selvarani, G., Sahu, A.K., Sridhar, P., Pitchumani, S., and Shukla, A.K. (2008). Effect of diffusion-layer porosity on the performance of polymer electrolyte fuel cells. Journal of Applied Electrochemistry, 38. 2008. 357-362.

Product Sheet. Toray. Electrode base material for fuel cell Physical property table Retrieved from: http://www.torayca.com/en/lineup/composites/com_009_01.html.

Product Listing. Toray Paper 090—PTFE Treated. FuelCellsEtc: Commercial Fuel Cell Components Manufacturer.

Wang, W.H., Wang, X.D. (2007). Investigation of Ir-modified carbon felt as the positive electrode of an all-vanadium redox flow battery. Electrochimica Acta 52. 2007. pp. 6755-6762.

Weber, A.Z., Mench, M.M., Meyers, J.P., Ross, P.N., Gostick, J.T., and Liu, Q. (2011). Redox flow batteries: A review. Journal of Applied Electrochemistry, 41. 2011. pp 1137-1164.

Wei, X., Nie, Z., Luo, Q., Li, B., Sprenkle, V., Wang, W. (2013). Polyvinyl chloride/silica nanoporous composite separator for all-vanadium redox flow battery applications. Journal of the Electrochemical Society, 160(8). 2013. pp. A1215-A1218.

Yue, L., Li, W., Sun, F., Zhao, L., and Xing, L. (2010). Highly hydroxylated carbon fibres as electrode materials of all-vanadium redox flow battery. Carbon 48. 2010. pp 3079-3090.

Zhou, X.L., Zhao, T.S., An, L., Wei, L., and Zhang, C. (2015). The use of polybenzimidazole membranes in Vanadium redox flow batteries leading to increased coulombic efficiency and cycling performance. Electrochimica Acta 153. 2015. pp. 492-498.

Extended European Search Report for European Patent Application No. 19188587.0 completed Dec. 18, 2019.

European Search Report for European Patent Application No. 19188587.0 completed Dec. 18, 2019.

(56) References Cited

OTHER PUBLICATIONS

File History for United States U.S. Appl. No. 13/513,651 now U.S. Pat. No. 9,166,243 issued Oct. 20, 2015.
Certified Translation. Japanese Publication of Examined Patent Application No. S52-102887 published Jul. 13, 1979.
Certified Translation. Japanese Unexamined Patent Application No. H2-148659 published Jun. 7, 1990.
Certified Translation. Japanese Unexamined Patent Application No. 2006-156029 published Jun. 15, 1990.
Linden, D. and Reddy, T.B. Eds. (2002). Handbook of batteries. New York, NY: McGraw-Hill. pp. 37.12, 18-23, 42.3-13, 43.11-3, Appendix A.
Laramini, J. and Dicks, A. (2003). Fuel cell systems explained. Chichester, England: John Wiley & Sons Inc. pp. xv, xvi, 18-19, 88-89, 94-96.
Haar, D. (2016). Dan Haar: United Technologies battery could upend the power business. Hartford Courant. Retrieved Feb. 22, 2017 from: http://www.courant.com/business/dan-haar/hc-haar-united-technologies-battery-for-electric-grid-20160523-column.html.
Aricò, A.S., Creti, P., Baglio, V., Modica, E., and Antonucci, V. (2000). Influence of flow field design on the performance of a direct methanol fuel cell. Journal of Power Sources vol. 91. 2000. pp. 202-209.
Li, X. and Sabir, I. (2004). Review of bipolar plates in PEM fuel cells: Flow-field designs. International Journal of Hydrogen Energy vol. 30. 2005. pp. 359-371.
Negishi, A. (2003). Redox flow battery. (Certified Translation). Fuel Cells vol. 2(4). 2003. pp. 69-74.
Yi, J.S., and Nguyen T.V. (1996). Abstract: Hydrodynamics of reactant gas in the electrode of PEM fuel cells with inter-digitated flow fields. The Electrochemical Society, Inc. Meeting Abstracts. Fall Meeting, San Antonio, TX. Oct. 6-11, 1996. p. 974-6.
Kazim, A., Liu, H.T., and Forges, P. (1999). Modelling of performance of PEM fuel cells with conventional and interdigitated flow fields. Journal of Applied Electrochemistry vol. 29(12). 1999. pp. 1409-1416.
Wang, L. and Liu, H. (2004). Performance studies of PEM fuel cells with interdigitated flow fields. Journal of Power Sources vol. 13(2). 2004. pp. 185-196.
Guo, S.M. (2005). The simulation of a PEMFC with an interdigitated flow field design. Computational Science 5th International Conference. May 2005. pp. 104-111.
He, W., Yi, J.S., Nguyen, T.V. (2000). Two-phase flow model of the cathode of PEM fuel ceels using interdigitated flow fields. AIChE Journal vol. 46(10). Oct. 2000. pp. 2053-2064.
Nozaki, K., Hamamoto, O., Kaneko, H., and Ozawa, T. (1975). (Certified Translation). Prospect of power storage using redox flow type secondary battery. Electrochemical/Electro-thermal Study Group Material. The Institute of Electrical Engineers of Japan. Nov. 28, 1975. pp. 1-16.
Declaration of Dr. Toru Kato, Ph.D. In re U.S. Appl. No. 9,166,243. Executed Feb. 23, 2017. pp. 1-89.
Prior Art Claim Chart for U.S. Pat. No. 9,166,243.
Ponce de León, C., Frías-Ferrer, A., González-García, Szánto, D.A., and Walsh, F.C. (2006). Redox flow cells for energy conversion. Journal of Power Sources vol. 160. 2006. pp. 716-732.
Nozaki, K., Hamamoto, O., Kaneko, H., and Ozawa, T. (1975). Prospect of power storage using redox flow type secondary battery. Electrochemical/Electro-thermal Study Group Material. The Institute of Electrical Engineers of Japan. Nov. 28, 1975 pp. 1-16.
Shigematsu, T. (2011). Redox flow battery for energy storage. SEI Technical Review No. 73. Oct. 2011. pp. 4-13.
Tokuda, N., Kanno, T., Hara, T Shigematsu, T., Tsutsui, Y., Ikeuchi, A., Itou, T., et al. (2000). Development of a redox flow battery system. SEI Technical Review No. 73. Jun. 2000. pp. 88-94.
Hagedorn, N.H. (1984). NASA redox storage system development project. Final Report. DOE/NASA/12726-24. Oct. 1984. pp. 1-43.
Sumitomo Electric. Redox Flow Battery. Technical Document. Retrieved May 8, 2017 from: http://global-sei.com/products/redox/pdf/redox-flow-battery.pdf.
Petition for Inter Partes Review of U.S. Pat. No. 9,166,243. *Sumitomo Electric Industries, Ltd.,* Petitioner, v. *United Technologies Corporation,* Patent Owner. Filed Feb. 23, 2017.
Final Written Decision. *Sumitomo Electric Industries, Ltd.,* Petitioner, v. *United Technologies Corporation,* Patent Owner. IPR2017-00966. U.S. Pat. No. 9,166,243. Entered Sep. 12, 2018. pp. 1-33.

\* cited by examiner

REDOX FLOW BATTERY WITH ELECTROLYTE BALANCING AND COMPATIBILITY ENABLING FEATURES

CROSS-REFERENCE TO RELATED APPLICATION

The present disclosure is a divisional of U.S. patent application Ser. No. 16/052,727 filed Aug. 2, 2018.

BACKGROUND

Flow batteries, also known as redox flow batteries or redox flow cells, are designed to convert electrical energy into chemical energy that can be stored and later released when there is demand. As an example, a flow battery may be used with a renewable energy system, such as a wind-powered system, to store energy that exceeds consumer demand and later release that energy when there is greater demand.

A typical flow battery includes a redox flow cell that has a negative electrode and a positive electrode separated by an electrolyte layer, which may include a separator, such as an ion-exchange membrane. A negative fluid electrolyte (sometimes referred to as the anolyte) is delivered to the negative electrode and a positive fluid electrolyte (sometimes referred to as the catholyte) is delivered to the positive electrode to drive reversible redox reactions between redox pairs. Upon charging, the electrical energy supplied causes a chemical reduction reaction in one electrolyte and an oxidation reaction in the other electrolyte. The separator prevents the electrolytes from freely and rapidly mixing but permits selected ions to pass through to complete the redox reactions. Upon discharge, the chemical energy contained in the liquid electrolytes is released in the reverse reactions and electrical energy can be drawn from the electrodes.

SUMMARY

A method for a redox flow battery according to an example of the present disclosure includes using first and second cells of a redox flow battery to store input electrical energy upon charging and discharge the stored electrical energy upon discharging. Each cell has a separator layer arranged between first and second electrodes. A polysulfide electrolyte solution of pH 11.5 or greater is circulated through a first circulation loop in fluid connection with the first electrode of the first cell, and an iron electrolyte solution of pH 3 or less is circulated through a second circulation loop in fluid connection with the second electrode of the second cell, and an intermediator electrolyte solution is circulated through a third circulation loop in fluid connection with the second electrode of the first cell and the first electrode of the second cell. Sulfur from the polysulfide electrolyte solution in the first electrode of the first cell permeates through the ion-exchange layer of the first cell and precipitates as a solid sulfide product in the second electrode and iron from the iron electrolyte solution in the second electrode of the second cell permeates through the ion-exchange layer of the second cell and precipitates as solid iron product. The intermediator electrolyte solution is emptied from either the second electrode of the first cell or the first electrode of the second cell, either the solid sulfide product is recovered to the polysulfide electrolyte solution or the solid iron product is recovered to the iron electrolyte solution by, respectively, circulating at least a portion of the polysulfide electrolyte solution from the first circulation loop through the second electrode to dissolve, and thereby remove, the solid sulfide product from the second electrode of the first cell, and then transferring the polysulfide electrolyte solution with the dissolved solid sulfide product back in to the first loop, or circulating at least a portion of the iron electrolyte solution from the second circulation loop through the first electrode to dissolve, and thereby remove, the solid iron product from the first electrode of the second cell, and then transferring the iron electrolyte solution with the dissolved solid iron product back in to the second loop.

A further embodiment of any of the foregoing embodiments includes maintaining the intermediator electrolyte solution at a pH 12 or greater so that the iron precipitates upon permeation through the ion-exchange layer from the second electrode of the second cell into the first electrode of the second cell.

A further embodiment of any of the foregoing embodiments includes maintaining the intermediator electrolyte solution at a pH 12 or greater so that the sulfur precipitates upon permeation through the ion-exchange layer from the first electrode of the first cell into the second electrode of the first cell.

A method for a redox flow battery according to an example of the present disclosure includes using first and second cells of a redox flow battery to store input electrical energy upon charging and discharge the stored electrical energy upon discharging. Each cell has a separator layer arranged between first and second electrodes. A polysulfide electrolyte solution of pH 11.5 or greater is circulated through a first circulation loop in fluid connection with the first electrode of the first cell, an iron electrolyte solution of pH 3 or less is circulated through a second circulation loop in fluid connection with the second electrode of the second cell, and an intermediator electrolyte solution is circulated through a third circulation loop in fluid connection with the second electrode of the first cell and the first electrode of the second cell. A third cell is used to electrolyze either the polysulfide electrolyte solution to produce hydrogen gas or the iron electrolyte solution to produce oxygen gas. The pH of the polysulfide electrolyte solution is maintained to be pH 11.5 or greater or the pH of the iron electrolyte solution is maintained to be pH 3 or less by, respectively, introducing the oxygen gas into the polysulfide electrolyte solution to adjust the pH of the polysulfide electrolyte solution, or introducing the hydrogen gas into the iron electrolyte solution to adjust the pH of the iron electrolyte solution.

In a further embodiment of any of the foregoing embodiments, the introducing of the oxygen gas includes sparging the oxygen gas through the polysulfide electrolyte solution.

In a further embodiment of any of the foregoing embodiments, the introducing of the hydrogen gas includes sparging the hydrogen gas through the iron electrolyte solution.

A method for a redox flow battery according to an example of the present disclosure includes using a cell of a redox flow battery to store input electrical energy upon charging and discharge the stored electrical energy upon discharging. The cell has a separator layer arranged between first and second electrodes. A polysulfide electrolyte solution of pH 11.5 or greater is circulated through a first circulation loop in fluid connection with the first electrode of the cell, and a manganate electrolyte solution is circulated through a second circulation loop in fluid connection with the second electrode of the cell. Sulfur from the polysulfide electrolyte solution in the first electrode permeates through the ion-exchange layer and precipitates as a solid sulfide product in the second electrode and manganese from the manganate electrolyte solution in the permeates through the ion-exchange layer of the second cell and precipitates as solid iron product in the first electrode. Either the solid sulfide product is recovered to the polysulfide electrolyte solution or the solid manganese product is recovered to the manganate electrolyte solution by, respectively, circulating at least a portion of the polysulfide electrolyte solution from the first circulation loop through the second electrode to dissolve, and thereby remove, the solid sulfide product from the second electrode, and then transferring the polysulfide electrolyte solution with the dissolved solid sulfide product back in to the first loop, or circulating at least a portion of the manganate electrolyte solution from the second circulation loop through the first electrode to dissolve, and thereby remove, the solid manganese product from the first electrode, and then transferring the manganese electrolyte solution with the dissolved solid iron product back in to the second loop.

A further embodiment of any of the foregoing embodiments includes passing the polysulfide electrolyte solution with the dissolved solid sulfide product in a first direction through a bi-directional filter and passing the manganate electrolyte solution with the dissolved solid manganese product in a second, opposite direction through the bi-directional filter.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Redox flow batteries ("RFB") utilize electrochemically active species that include ions of elements that have multiple, reversible oxidation states in a selected liquid solution. Example species may include transition metals, such as vanadium, iron, manganese, chromium, zinc, or molybdenum, or other elements such as sulfur, cerium, lead, tin, titanium, germanium, bromine, or chlorine. Although these species have been used, not all of them are compatible for use together. For instance, over time, there is mixing of species due to cross-over of the species through the separator. If incompatible, the cross-over species may react to precipitate as an insoluble solid or to generate gases that escape to the surroundings. Insoluble solids may block flow and debit performance. Gaseous losses may pose a health concern and may reduce species availability for proper functionality.

Two species that are attractive for use in RFBs due to low cost are iron and sulfur. However, iron and sulfur electrolytes, such as iron in hydrochloric acid and sulfur in sodium hydroxide, are highly incompatible. Iron that crosses-over into the basic pH sulfur electrolyte reacts to form insoluble iron oxide ($Fe_2O_3$) and sulfur that crosses-over into the acidic pH iron electrolyte reacts to form gaseous hydrogen sulfide ($H_2S$). Over time, the loss of iron, clogging from the insoluble iron oxide, and the loss of sulfur to hydrogen sulfide will render the RFB inoperable or, at the least, reduce round-trip efficiency to unfeasible levels for use as an RFB. As will be discussed below, the disclosed RFB utilizes an intermediator electrolyte that mitigates incompatibility and enables use of sulfide and iron electrolytes in the RFB.

Figure 1:
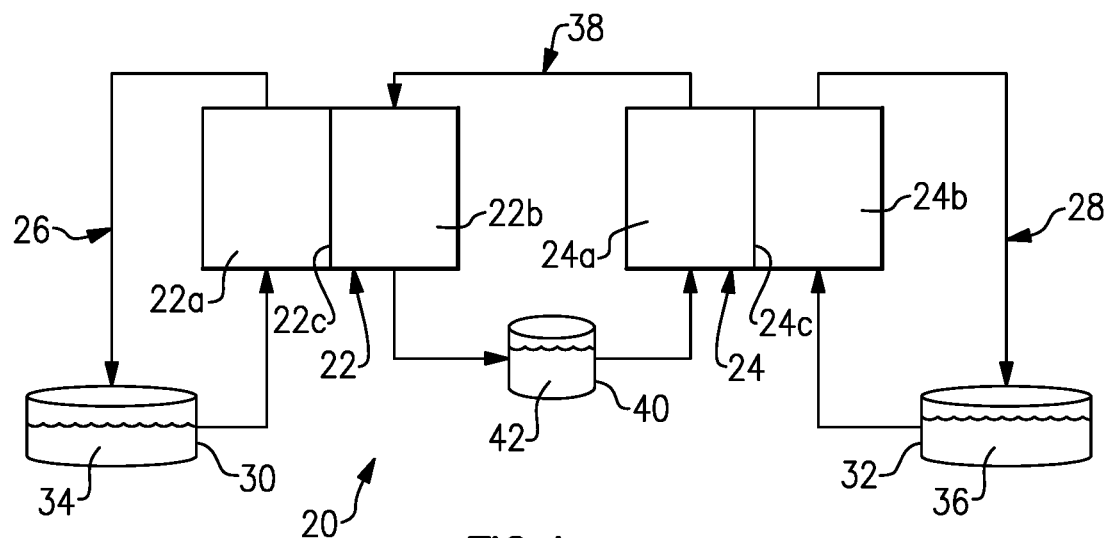
FIG. 1 illustrates an example redox flow battery.

FIG. 1 schematically illustrates an RFB 20. The RFB 20 includes a first cell 22 and a second cell 24. The cells 22 and 24 are of nominally identical constriction. The cells 22 and 24 include, respectively, first electrodes 22a and 24a, second electrodes 22b and 24b, and separator layers 22c and 24c between the electrodes (layer 22c between electrodes 22a and 22b, and layer 24c between electrodes 24a and 24b). For example, the electrodes 22a, 22b, 24a, and 24b are porous carbon structures, such as carbon paper or felt. The separator layers are ion-exchange membranes 22c and 24c, which permit selected ions to pass through to complete the redox reactions while electrically isolating the electrodes.

A first circulation loop 26 is fluidly connected with the first electrode 22a of the first cell 22, and a second circulation loop 28 is fluidly connected with the second electrode 24b of the second cell 24. As used herein, a "loop" refers to a continuous, closed circuit fluid passage. The first circulation loop 26 and the second circulation loop 28 may include respective electrolyte storage tanks 30 and 32. A polysulfide electrolyte solution 34 is contained in the first recirculation loop 26 (e.g., in the tank 30), and an iron electrolyte solution 36 is contained in the second circulation loop 28 (i.e., in the tank 32). The polysulfide electrolyte solution 34 has a pH 11.5 or greater, and the iron electrolyte solution has a pH 3 or less.

The polysulfide in the polysulfide electrolyte solution 34 generally refers to salts of sulfur in a basic pH solution. For example, the salt is sodium salt with the formula $Na_2S_x$, where x is 2 to 5, in sodium hydroxide. In one example, the polysulfide electrolyte solution 34 may be 2M $Na_2S_x$ in 1M sodium hydroxide. The iron in the iron electrolyte solution 36 generally refers to iron salts in an acidic solution. In one example, the iron electrolyte solution 36 may be 1M $FeCl_x$ in 1M NaCl and 0.3M HCl.

The RFB 20 further includes a third circulation loop 38 fluidly connected with the second electrode 22b of the first cell 22 and the first electrode 24a of the second cell 24. The third circulation loop 38 may include an electrolyte storage tank 40. The third circulation loop 38 contains an intermediator electrolyte solution 42 (i.e., in the tank 42) that participates in reactions in both cells 22 and 24. The intermediator electrolyte solution 42 has a pH 12 or greater. For example, the intermediator electrolyte solution 42 includes at least one of quinoxaline, anthraquinone, or benzoquinone. In one example, the intermediator electrolyte solution 42 includes at least one of 1,2-benzoquinone-3,5-disulfonic acid, 4,4'-((9,10-anthraquinone-2,6-diyl)dioxy) dibutyrate (2,6-DBEAQ), 1,2-DBEAQ, or 1,8-DBEAQ. Other functionalized hydroxylated anthraquinones, e.g. 2,6-dihydroxyanthraquinone (2,6-DHAQ), may also be used. Other organic-based redox couples include molecules based on viologens, quinoxalines, or alloxazines. Organomettalic reactants may also be used, such as ferrocenes. In one example, the intermediator electrolyte solution is 0.4M NaFe(CN)$_6$ in 1M NaOH and 1M NaCl. In another example, the intermediator electrolyte solution is 0.5M 2,6-DBEAQ in 0.5M NaOH and 0.5M NaCl.

The polysulfide electrolyte solution 34 circulates through the first electrode 22a of the first cell 22 and the iron electrolyte solution circulates through the second electrode 24b of the second cell 24. The intermediator electrolyte solution 42 circulates through the second electrode 22b of the first cell 22 and the first electrode 24a of the second cell 24. The polysulfide electrolyte solution 34 and the intermediator electrolyte solution 42 in the first cell 22, and the iron electrolyte solution 36 and the intermediator electrolyte solution 42 in the second cell 24, are operable to undergo reversible reactions to store input electrical energy upon charging and discharge the stored electrical energy upon discharging. The electrical energy may be transmitted to and from the cells 22 and 24 through an electric circuit that is electrically coupled with the electrodes 22a, 22b, 24a, and 24b.

The following equations demonstrate example reactions in the first cell 22, as well as the resulting standard electrode potential (E°) versus Standard Hydrogen Electrode (SHE) and Open Cell Voltage (OCV) is defined herein as the difference of the standard electrode potentials of the two electrode reactions.

$$2Na_2S_2 \leftrightarrow Na_2S_4 + 2Na^+ + 2e'; E° = -0.45 \text{vs SHE}$$

$$[Fe(CN)_6]^{3-} + e' \leftrightarrow [Fe(CN)_6]^{4-}; E° = +0.36 \text{vs SHE}$$

$$OCV = 0.81V$$

The following equations demonstrate example reactions in the second cell 24, as well as the resulting standard electrode potential (E°) versus Standard Hydrogen Electrode (SHE) and Open Cell Voltage (OCV).

$$[Fe(CN)_6]^{4-} \leftrightarrow [Fe(CN)_6]^{3-} + e'; E° = +0.36 \text{vs SHE}$$

$$2FeCl_3 + 2Na^+ + 2e' \leftrightarrow 2FeCl_2 + 2NaCl; E° = +0.771 \text{vs SHE}$$

$$OCV = 0.41V$$

The net reaction is:

$$2Na_2S_2 + 2FeCl_3 \rightarrow Na_2S_4 + 2FeCl_2 + 2NaCl$$

$$OCV = 1.218V$$

As discussed above, polysulfide and iron electrolyte solutions are generally incompatible in RFBs. However, the intermediator electrolyte solution 42 in the RFB 20 mitigates the incompatibility and enables use of sulfide and iron electrolytes together. For instance, rather than sulfur crossing-over into an iron solution, the sulfur in the RFB 20 crosses-over into the intermediator electrolyte solution 42. And rather than iron crossing-over into a sulfur solution, the iron in the RFB 20 crosses-over into the intermediator electrolyte solution 42. The intermediator electrolyte solution 42 is selected to produce more desirable reactions with the sulfur and the iron such that the sulfur and iron can readily be recovered and returned to their respective solutions 34 and 36.

For example, when sulfur crosses-over from the first electrode 22a through the ion-exchange layer 22c and into the intermediator electrolyte solution 42 at the second electrode 22b, the sulfur precipitates as a solid sulfur product. When iron crosses-over from the second electrode 24b through the ion-exchange layer 24c and into the intermediator electrolyte solution 42 at the first electrode 24a, the iron precipitates as a solid iron product. The conditions for the sulfur and the iron to precipitate require that the pH of the intermediator electrolyte solution 42 be 12 or greater and that the standard electrode potential be greater than −0.3V. At pH less than approximately 12 or standard electrode potential less than approximately −0.3V, the sulfur may react to form hydrogen sulfide gas and the iron may react to form insoluble iron oxide. As will be discussed later below, the solid sulfur product and solid iron oxide product can readily be recovered and incorporated back into, respectively, the polysulfide electrolyte solution 34 and the iron electrolyte solution 36 to maintain RFB performance.

In addition to a pH of 12 or greater and a standard electrode potential of −0.3V or higher, the selected intermediator electrolyte solution 42 has highly reversible kinetics between its reduction and oxidation reactions, has ionic function groups (e.g., OH⁻), and is a large molecule to reduce cross-over of the intermediator. Solubility of the intermediator electrolyte solution 42 is not critical, since the intermediator electrolyte solution 42 maintains a state-of-charge of approximately 50% at all times and only a limited quantity of the intermediator electrolyte is required (i.e., the amount does not determine the total energy capacity of the battery).

Figure 2:
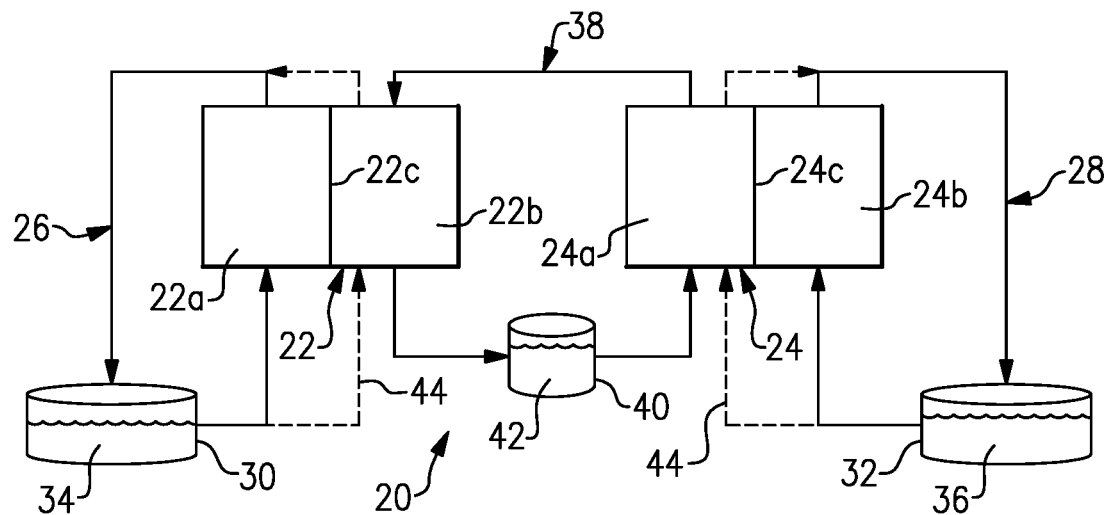
FIG. 2 illustrates the redox flow battery with flush lines.
Figure 3:
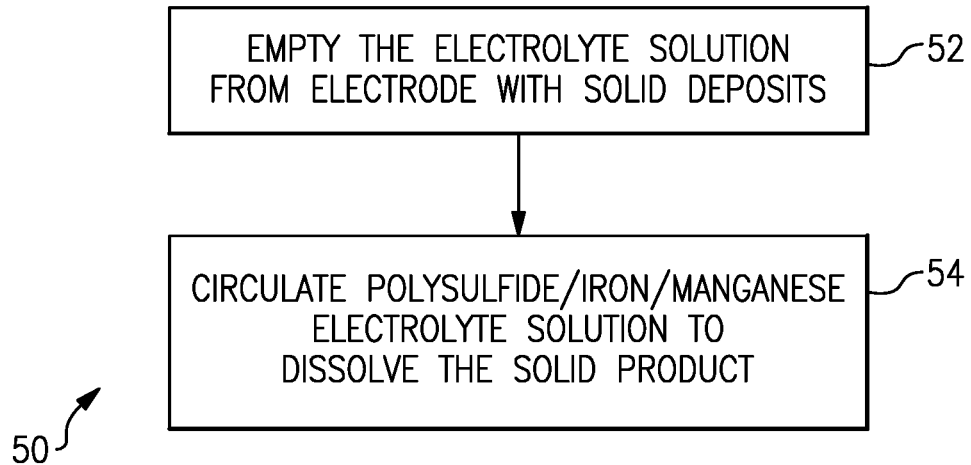
FIG. 3 illustrates a method for recovering sulfur, iron, or manganese in a redox flow battery.

FIG. 2 depicts a further example of the RFB 20. In this example, the RFB 20 additionally includes one or more flush lines 44. The flush lines 44 may be used to remove and recover the solid sulfur product and the solid iron product according to an electrolyte-takeover method (ETM) 50 illustrated in FIG. 3. The method 50 generally includes steps 52 and 54. At step 52 the intermediator electrolyte solution 42 is emptied from the second electrode 22b of the first cell and/or the first electrode 24a of the second cell 24. At step 54 the polysulfide electrolyte solution 34 is circulated via the flush line 44 through the second electrode 22b of the first cell and/or the iron electrolyte solution 36 is circulated via the flush line 44 through the first electrode 24a of the second cell 24. The solid sulfide product is readily soluble in the polysulfide electrolyte solution 34. The polysulfide electrolyte solution 34 thus dissolves and removes the solid sulfide product from the second electrode 22b. Similarly, the solid iron product is readily soluble in the iron electrolyte solution 36. The iron electrolyte solution 36 thus dissolves and removes the solid iron product from the first electrode 24b.

Once the solid sulfur and/or iron products have been removed to a desired level, the polysulfide electrolyte solution 34 is then transferred back into the first loop 26 and the iron electrolyte solution 36 is transferred back into the second loop 28. The intermediator electrolyte solution 42 can then resume circulation through the cells 22 and 24 to charge or discharge the RFB 20.

Figure 5:
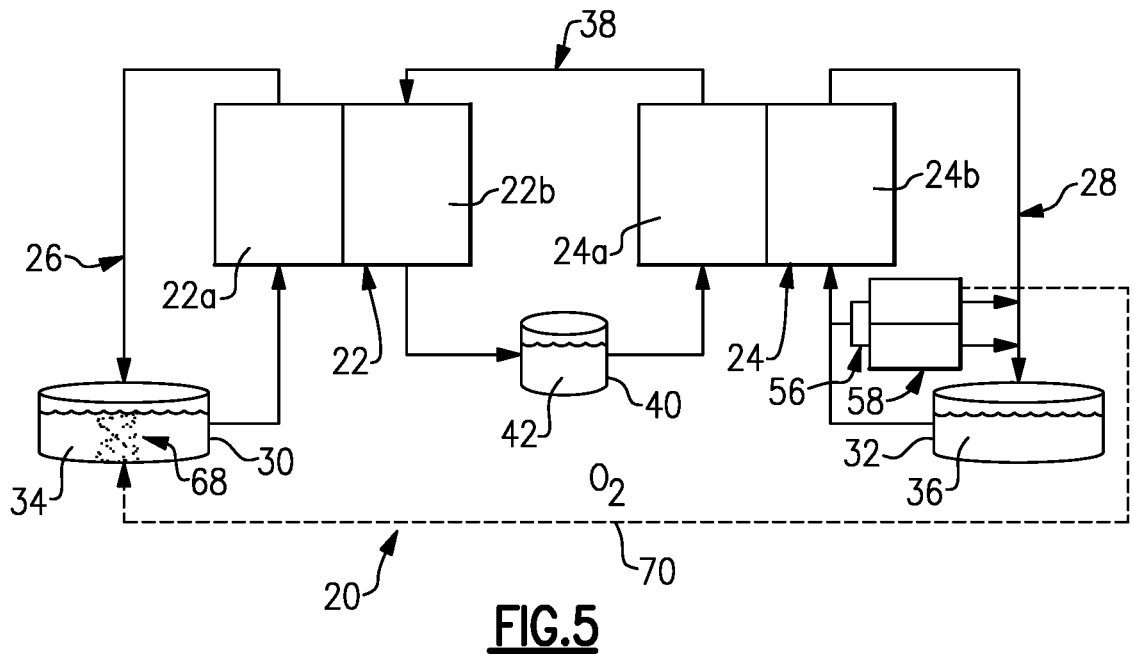
FIG. 5 illustrates a bypass line and a third cell in the second loop of the redox flow battery.
Figure 4:
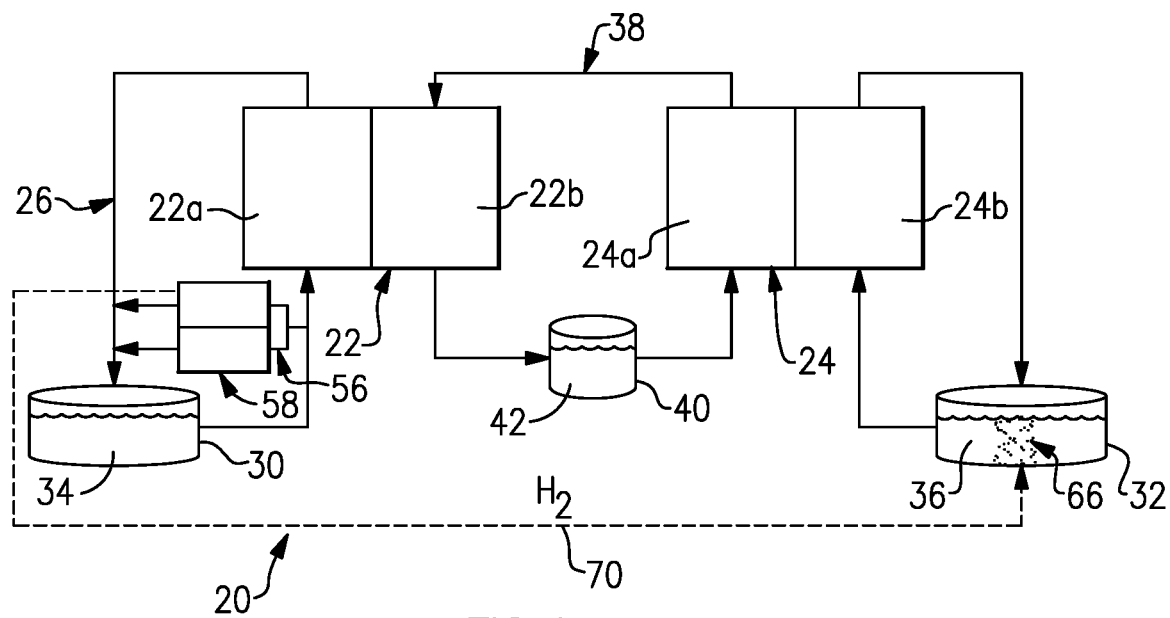
FIG. 4 illustrates a bypass line and a third cell in the first loop of the redox flow battery.
Figure 6:
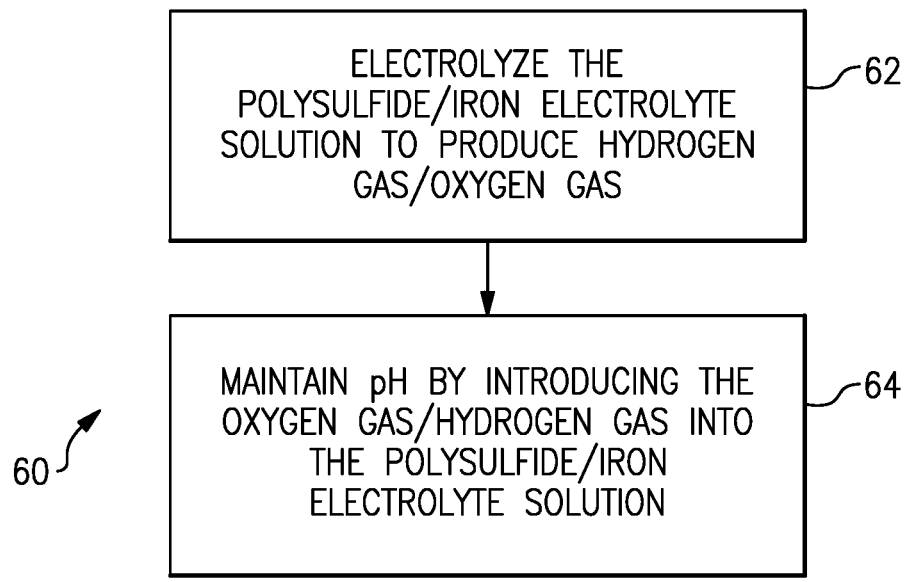
FIG. 6 illustrates an example method of maintaining pH in the polysulfide electrolyte solution or the iron electrolyte solution of the flow battery.

FIGS. 4 and 5 depict further examples of the RFB 20. In these examples, the RFB 20 additionally includes a bypass line 56 and a third cell 58 in the bypass line 56. In FIG. 4, the bypass line 56 and the third cell 58 are in the first loop 26, and in FIG. 5 the bypass line 56 and the third cell 58 are in the second loop 28. The bypass line 56 and the third cell 58 may be used according to a method 60 in FIG. 6 to maintain the pH of the polysulfide electrolyte solution 34 to be pH 11.5 or greater or the pH of the iron electrolyte solution 36 to be pH 3 or less.

At step 62, the third cell 58 is used to electrolyze the polysulfide electrolyte solution 34 (FIG. 4) or the iron electrolyte solution 36 (FIG. 5). The third cell 58 is an electrolyzer cell that uses input electrical power to drive an electrolysis reaction of the polysulfide electrolyte solution 34 to generate hydrogen gas or the iron electrolyte solution 36 to generate oxygen gas. The respective net reactions are as follows.

(polysulfide electrolyte solution)

$$2H_2O + 2Na_2S_2 \rightarrow Na_2S_4 + 2NaOH + H_2(g)$$

(iron electrolyte solution)

$$2H_2O + 4FeCl_3 \rightarrow 4FeCl_2 + 4HCl + O_2(g)$$

At step 64, the hydrogen can be introduced into the iron electrolyte solution 36 to adjust the pH of the iron electrolyte solution 36 and/or the oxygen gas can be introduced into the polysulfide electrolyte solution 34 to adjust the pH of the polysulfide electrolyte solution 34. For instance, the introducing of the hydrogen gas involves sparging (bubbling) the hydrogen gas through iron electrolyte solution 36, such as in the tank 32 as shown at 66 (FIG. 4). The hydrogen reacts with the iron electrolyte solution 36 to lower the pH. The introducing of the oxygen gas involves sparging (bubbling) the oxygen gas through polysulfide electrolyte solution 34, such as in the tank 30 as shown at 68 (FIG. 5). The oxygen reacts with the polysulfide electrolyte solution 34 to increase the pH. In these regards, the third cell 58 may be connected by a bleed line 70 to either the second loop 28 (FIG. 4) or the first loop (FIG. 5).

Additional species that are attractive for use in RFBs due to low cost are permanganate and sulfur. However, manganate species that cross-over into the low potential sulfur electrolyte reduces to form insoluble manganate hydroxide $Mn(OH)_2$ and sulfur that crosses-over into the manganate electrolyte oxidizes to form solid sulfur metal. Over time, the loss of sulfur and manganate species, and clogging from the insoluble sulfur and manganate species will render the RFB inoperable or, at the least, reduce round-trip efficiency to unfeasible levels for use as an RFB. As will be discussed below, the disclosed RFB that utilizes manganate and sulfur does not necessarily require an intermediator electrolyte; however, it may employ similar recovery strategies as described above to mitigate the issues resulting from cross-over in the RFB.

The desired reactions in the polysulfide and maganate RFB are:

Negative: $2Na_2S_2 \leftrightarrow Na_2S_4 + 2Na^+ + 2e^-$ $E° = -0.447$vs. SHE Positive: $2NaMnO_4 + 2Na^+ + 2e^- \leftrightarrow 2Na_2MnO_4$ $E° = +0.558$vs. SHE Net cell: $2Na_2S_2 + 2NaMnO_4 \leftrightarrow Na_2S_4 + 2Na_2MnO_4$

OCV=1.01V

The fact that crossover results in solid deposits enables the S and Mn to be separated and returned to their original electrolyte. If solids are deposited in the electrodes, the ETM method 50 described above (for the Fe and S system) can be applied to dissolve and return the solid species to their original electrolyte. Furthermore, if these solids are in the membrane, then exposing both electrodes to the same electrolyte should enable dissolution and recovery. This recovery mechanism is expected to be quick (i.e., <1 hour) and, if needed, it can be conducted at elevated temperatures to accelerate the process. The end result is that electrolyte balance is maintained.

Figure 7:
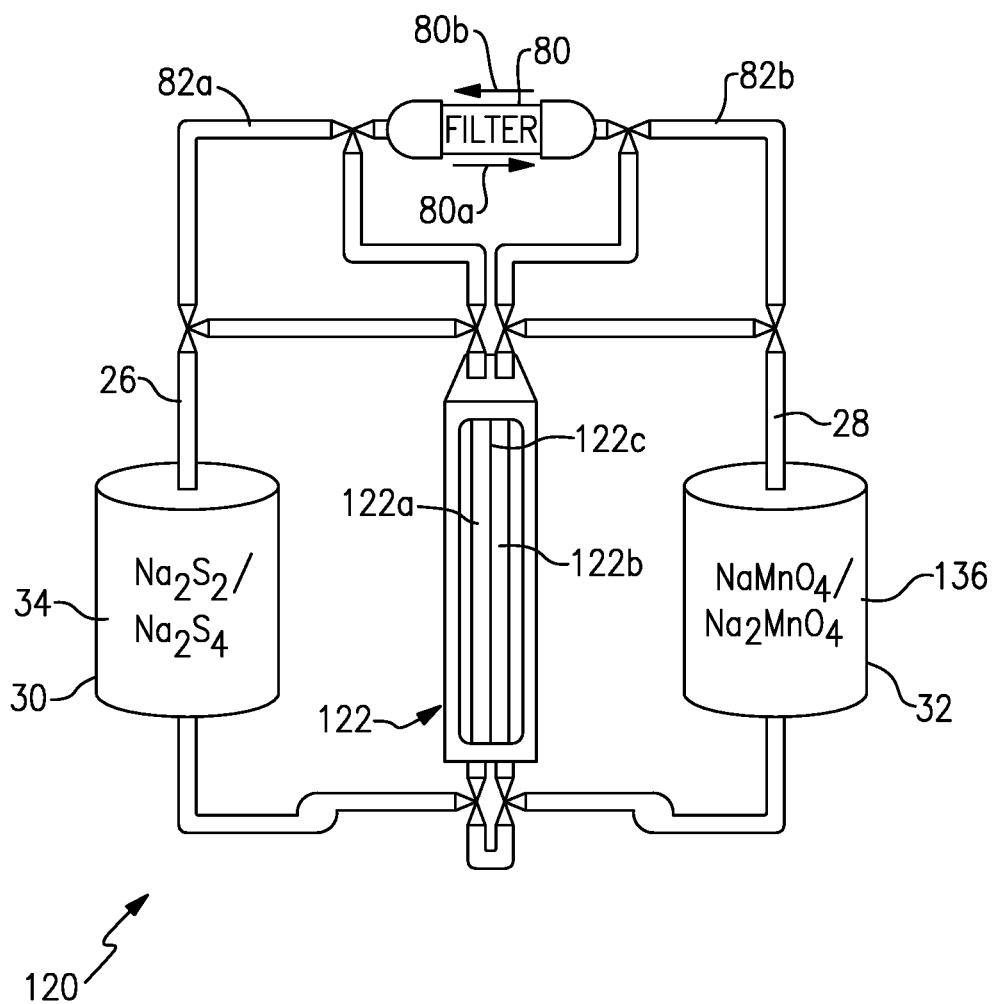
FIG. 7 illustrates another example redox flow battery and method in which sulfur and manganese are used as active species and precipitate of each is recovered using a recovery strategy method.

To illustrate, FIG. 7 shows another example RFB 120. The RFB 120 in this example does not include a third circulation loop and only includes a single, common cell 122 or stack of common cells. The cell 122 includes a first electrode 122a, a second electrode 122b, and separator layers 122c between the electrodes 122a and 122b. In this disclosure, like reference numerals designate like elements where appropriate and reference numerals with the addition of one-hundred or multiples thereof designate modified elements that are understood to incorporate the same features and benefits of the corresponding elements.

The first circulation loop 26 is fluidly connected with the first electrode 122a of the cell 122, and a second circulation loop 28 is fluidly connected with the second electrode 122b of the cell 122. The polysulfide electrolyte solution 34 is contained in the first recirculation loop 26 (e.g., in the tank 30), and a manganate electrolyte solution 136 is contained in the second circulation loop 28 (i.e., in the tank 32).

In the ETP method 50 the polysulfide electrolyte solution 34 is pumped through the second electrode 122b (after draining), which reduces, dissolves, and recaptures any solid $S^0$. The polysulfide electrolyte solution 34 is passed in a first direction 80a and through a bi-directional filter 80 that is in a first auxiliary loop 82a to capture any residual Mn that precipitates. Similarly, but at a different time, the manganate electrolyte solution 136 is pumped through first electrode 122a (after draining), which oxidizes and dissolves any $Mn(OH)_2$ precipitate. The manganate electrolyte solution 136 is passed in a second direction 80b through the same bi-directional filter 80 but as a part of a second auxiliary loop 82b to capture any residual S that precipitates. The bi-directional filter 80 enables recapture of precipitated species that are filtered out to be recaptured in the polysulfide electrolyte solution 34 and the manganate electrolyte solution 136.

If the solids that result from crossover collect in the tanks 30 or 32, then these solids could be periodically removed from bottom reservoirs of the tanks 30 or 32 (the solids have significantly higher densities than the liquids and thus sink). It is expected that this process would not need to be done often, if at all, and does not need to be fully automated (i.e., this could be part of annual maintenance procedures).

Disproportionation reactions are a possibility, since Mn has a large number of oxidation states. If manganate disproportionates to $Mn(V)O_4^{3-}$, the compound rapidly decomposes and precipitates to $MnO_2$, but under strongly alkaline conditions, this reaction is not a concern (i.e., pH≥14). However, at high concentrations of NaOH, the following reaction can occur slowly:

$$4NaMnO_4 + 4NaOH \rightarrow 4Na_2MnO_4 + 2H_2O + O_2$$

Further reduction of manganate(VI) does not occur. The reaction is slow; measurements with a 4 M solution of $MnO_4^-$ in 7.5M $OH^-$ indicate a capacity retention of 80% after 1 month of storage of a fully charged solution. Nevertheless, this reaction will result in a permanent capacity loss, unless a mitigation strategy, such as one described below, is employed. Oxygen generation is also a concern since the reversible potential of the manganese couple is 157 mV higher than $E°$ for $O_2$ evolution (0.401 V vs. SHE) at pH=14. Therefore, the positive electrode material must be chosen to minimize catalyzing of $O_2$ evolution. $H_2$ evolution is not a concern because the reversible potential for polysulfide is above $E°$ for $H_2$ evolution.

Small amounts of $O_2$ evolved from the disproportionation reaction, or produced by the oxygen-evolution reaction in the positive electrode, can lead to electrolyte imbalance and result in energy capacity fade in the RFB. In this case, $O_2$ can be consumed by allowing it to react with the negolyte by connecting the gas space above the posolyte and negolyte reservoirs (this gas space shall be maintained as a $N_2$ blanket to prevent discharge of the anolyte):

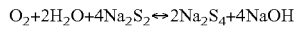
$$O_2+2H_2O+4Na_2S_2 \leftrightarrow 2Na_2S_4+4NaOH \qquad 5$$

The net of this reaction and the one above is a discharge of both electrolytes, but it results in the electrolytes being maintained at a constant composition. Another result of these reactions will be an increase of the pH of polysulfide electrolyte solution 34 and a decrease in the manganate electrolyte solution 136, but changes in water concentrations and [OH⁻] should be offset by diffusion through the membrane. If this is not the case, one can optionally utilize the pH adjustment cells and process described above for the Fe and S in method 60, except only using the second step 64 to adjust for the decomposition of the manganese electrolyte (i.e., introduce $O_2$ gas into the polysulfide, which is already included therein).

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A method for a redox flow battery, the method comprising:
    using first and second cells of a redox flow battery to store input electrical energy upon charging and discharge the stored electrical energy upon discharging,
        wherein each said cell has a separator layer arranged between first and second electrodes,
        wherein the using includes
        circulating a polysulfide electrolyte solution of pH 11.5 or greater through a first circulation loop in fluid connection with the first electrode of the first cell,
        circulating an iron electrolyte solution of pH 3 or less through a second circulation loop in fluid connection with the second electrode of the second cell, and
        circulating an intermediator electrolyte solution through a third circulation loop in fluid connection with the second electrode of the first cell and the first electrode of the second cell, and
    sulfur from the polysulfide electrolyte solution in the first electrode of the first cell permeates through the ion-exchange layer of the first cell and precipitates as a solid sulfide product in the second electrode and iron from the iron electrolyte solution in the second electrode of the second cell permeates through the ion-exchange layer of the second cell and precipitates as solid iron product;
    emptying the intermediator electrolyte solution from either the second electrode of the first cell or the first electrode of the second cell; and
    recovering either the solid sulfide product to the polysulfide electrolyte solution or the solid iron product to the iron electrolyte solution by, respectively,
        circulating at least a portion of the polysulfide electrolyte solution from the first circulation loop through the second electrode to dissolve, and thereby remove, the solid sulfide product from the second electrode of the first cell, and then transferring the polysulfide electrolyte solution with the dissolved solid sulfide product back in to the first loop, or
        circulating at least a portion of the iron electrolyte solution from the second circulation loop through the first electrode to dissolve, and thereby remove, the solid iron product from the first electrode of the second cell, and then transferring the iron electrolyte solution with the dissolved solid iron product back in to the second loop.

2. The method as recited in claim 1, including maintaining the intermediator electrolyte solution at a pH 12 or greater so that the iron precipitates upon permeation through the ion-exchange layer from the second electrode of the second cell into the first electrode of the second cell.

3. The method as recited in claim 1, including maintaining the intermediator electrolyte solution at a pH 12 or greater so that the sulfur precipitates upon permeation through the ion-exchange layer from the first electrode of the first cell into the second electrode of the first cell.

4. A method for a redox flow battery, the method comprising:
    using first and second cells of a redox flow battery to store input electrical energy upon charging and discharge the stored electrical energy upon discharging,
        wherein each said cell has a separator layer arranged between first and second electrodes,
        wherein the using includes
        circulating a polysulfide electrolyte solution of pH 11.5 or greater through a first circulation loop in fluid connection with the first electrode of the first cell,
        circulating an iron electrolyte solution of pH 3 or less through a second circulation loop in fluid connection with the second electrode of the second cell, and
        circulating an intermediator electrolyte solution through a third circulation loop in fluid connection with the second electrode of the first cell and the first electrode of the second cell,
    using a third cell to electrolyze either the polysulfide electrolyte solution to produce hydrogen gas or the iron electrolyte solution to produce oxygen gas; and
    maintaining the pH of polysulfide electrolyte solution to be pH 11.5 or greater or the pH of the iron electrolyte solution to be pH 3 or less by, respectively,
        introducing the oxygen gas into the polysulfide electrolyte solution to adjust the pH of the polysulfide electrolyte solution, or
        introducing the hydrogen gas into the iron electrolyte solution to adjust the pH of the iron electrolyte solution.

5. The method as recited in claim 4, wherein the introducing of the oxygen gas includes sparging the oxygen gas through the polysulfide electrolyte solution.

6. The method as recited in claim 4, wherein the introducing of the hydrogen gas includes sparging the hydrogen gas through the iron electrolyte solution.

7. A method for a redox flow battery, the method comprising:
    using a cell of a redox flow battery to store input electrical energy upon charging and discharge the stored electrical energy upon discharging,
        wherein the cell has a separator layer arranged between first and second electrodes, wherein the using includes
circulating a polysulfide electrolyte solution of pH 11.5 or greater through a first circulation loop in fluid connection with the first electrode of the cell,
circulating an manganate electrolyte solution through a second circulation loop in fluid connection with the second electrode of the cell, and
sulfur from the polysulfide electrolyte solution in the first electrode permeates through the ion-exchange layer and precipitates as a solid sulfide product in the second electrode and manganese from the manganate electrolyte solution in the permeates through the ion-exchange layer of the second cell and precipitates as solid iron product in the first electrode;
recovering either the solid sulfide product to the polysulfide electrolyte solution or the solid manganese product to the manganate electrolyte solution by, respectively, circulating at least a portion of the polysulfide electrolyte solution from the first circulation loop through the second electrode to dissolve, and thereby remove, the solid sulfide product from the second electrode, and then transferring the polysulfide electrolyte solution with the dissolved solid sulfide product back in to the first loop, or
circulating at least a portion of the manganate electrolyte solution from the second circulation loop through the first electrode to dissolve, and thereby remove, the solid manganese product from the first electrode, and then transferring the manganese electrolyte solution with the dissolved solid iron product back in to the second loop.

8. The method as recited in claim 7, further comprising passing the polysulfide electrolyte solution with the dissolved solid sulfide product in a first direction through a bi-directional filter and passing the manganate electrolyte solution with the dissolved solid manganese product in a second, opposite direction through the bi-directional filter.

* * * * *